Nov. 6, 1956
C. V. KRICHTON
2,769,878
DEEP FAT FRYER
Filed Oct. 14, 1953
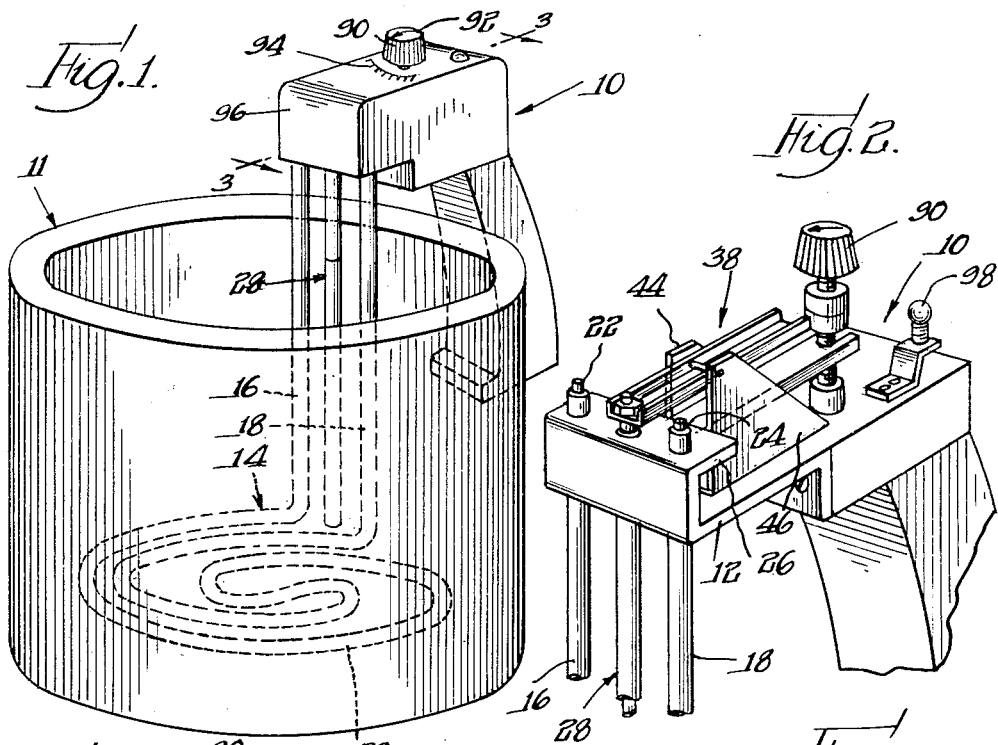
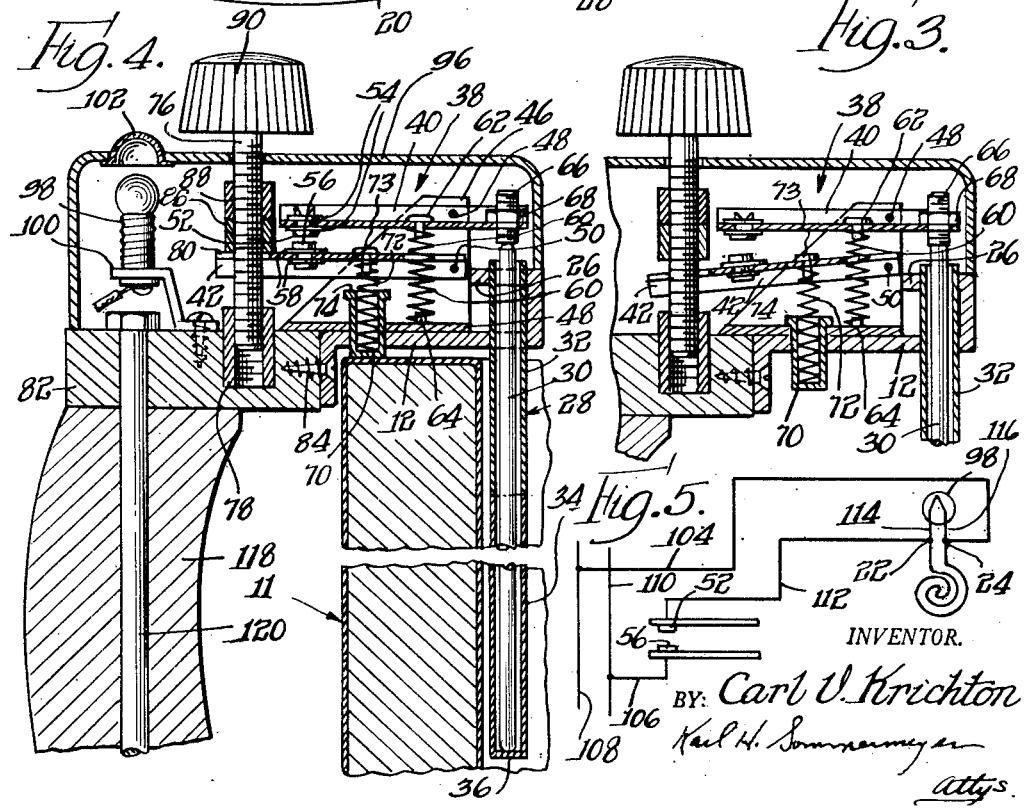
INVENTOR.
BY: Carl V. Krichton
Karl H. Sommenmeyer
attys.

2,769,878
DEEP FAT FRYER

Carl V. Krichton, Geneva, Ill., assignor to McGraw Electric Company, Elgin, Ill., a corporation of Delaware Application October 14, 1953, Serial No. 385,924

9 Claims. (Cl. 200—137)

The present invention relates to a novel switch structure, and more particularly to a novel combined thermostat and safety switch structure especially adapted for use with an immersion heater and the like.

An object of the present invention is to provide a novel switch structure for an electrical heating unit adapted to be removably placed in a heating position, which switch structure may be actuated by a thermostat heat responsive device to control the heating unit and is further constructed so that the switch structure is inoperative until the heating unit has been properly located in the heating position.

Another object of the present invention is to provide a novel switch structure of the above described type which is relatively simple and economical to manufacture and at the same time highly efficient in operation.

Another object of the present invention is to provide a novel switch structure of the above described type, whereby an initial relatively long heating period may be obtained to bring the material being heated quickly to the desired temperature and whereby subsequent heating periods are relatively short to maintain the heated material at a substantially constant temperature.

Other objects and advantages of the present invention will become apparent from the following description and the accompanying drawings, wherein:

Fig. 1 is a perspective view showing an immersion heating unit embodying the novel switch structure of this invention and positioned slightly above a container with which the heating unit is adapted to be associated;

Fig. 2 is an enlarged perspective view showing the novel switch structure of this invention in greater detail;

Fig. 3 is an enlarged fragmentary cross sectional view taken along line 3—3 in Fig. 1;

Fig. 4 is an enlarged fragmentary cross sectional view similar to Fig. 3 showing the heating unit associated with the container; and Fig. 5 is a diagrammatic view showing the electrical circuit of the heating unit.

Referring now more specifically to the drawings, wherein like parts are designated by the same numerals throughout the various figures, a heating unit 10 embodying the novel features of this invention is shown best in Fig. 1 in a position slightly above a liquid container 11 with which the heating unit is adapted to be associated. While various applications may be found for the novel features of this invention, the invention will be described with particular reference to its use in deep fat fryers. Thus, the container 11 is adapted to hold a body of melted fat or the like, and the heating unit 10 is adapted to be removably positioned on an upper edge of the container so that the heating element described below is immersed within the container.

In the particular embodiment illustrated, the heating unit 10 includes a mounting or base plae 12 from which a tubular shield 14 depends for housing an electrical resistance element. As shown best in Fig. 1, the tubular shield includes a pair of spaced legs 16 and 18 which are adapted to extend downwardly along the wall of the container and a spiral portion 20 connecting the lower ends of the legs and projecting laterally therefrom for overlying the bottom of the container. The electrical resistance element extends continuously through the tubular shield, and opposite ends of the resistance element emerge from the upper ends of the legs 16 and 18, as at 22 and 24 (see Fig. 2). As shown in Figs. 2, 3, and 4, the base or mounting plate 12 is preferably provided with a reversely bent flange 26 spaced vertically therefrom, and the flange and base plate are provided with aligned apertures for receiving upper end portions of the shield legs 16 and 18 for rigidly supporting the legs. The legs may be welded or brazed to the base plate, or otherwise securely fixed thereto.

Thermostat means is also mounted on the base or mounting plate 12 for controlling the temperature of the electrical resistance element, and this thermostat means includes a heat responsive unit 28 having a tubular shell and a rod-like member 30 disposed within the shell. The tubular shell includes an upper portion 32 extending through aligned apertures in the mounting plate 12 and flange 26 and fixed thereto such as by welding or brazing. A lower shell portion 34 having a closed bottom end 36 depends from the upper portion 32 and is preferably welded or brazed thereto. In order to control accurately the temperature of the liquid body in the container substantially without regard to temperature variations at or above the surface of the body, the lower shell portion 34 is constructed from a material such as brass or aluminum having a relatively high coefficient of expansion, while the upper shell portion 32 is constructed from a material having a relatively low coefficient of expansion such as various well known alloy steels. In addition, the rod 30 is constructed from a material such as glass which has a relatively low coefficient of expansion, whereby the rod will be raised or lowered with respect to the base or mounting plate 12 upon contraction or expansion of the lower shell portion 34.

In accordance with the present invention, a novel combined thermostat and safety switch structure 38 is provided for controlling the electrical resistance element of the heating unit. This switch structure includes a pair of switch arms 40 and 42 disposed between upstanding walls 44 and 46 of a bracket 48 secured to the base or mounting plate 12 by suitable means, not shown. The upper switch arm 40 is pivotally mounted between the bracket walls by a pin 48, and the lower switch arm 42 is similarly pivotally mounted by a pin 50. An electrical contact 52 is riveted or otherwise fixed to one end of the switch arm 40 and is electrically insulated therefrom by washers 54 which may be made of mica or any other suitable material. A similar contact 56 is riveted to the switch arm 42 and is insulated therefrom by mica washers 58. As will appear from the description hereinbelow, the electric circuit of the heating unit is such that the opening and closing of the contacts 52 and 56 controls the electrical resistance element.

As shown best in Figs. 3 and 4, the rod 30 of the thermostat heat responsive unit 38 is operatively associated with the upper switch arm 40 in order to actuate the switch in accordance with the temperature of the liquid in the container 12. Thus, the rod 30 is connected with the end of the switch arm 40 opposite the contact 52 so that when the rod is raised upon cooling of the liquid, the switch arm 40 is pivoted in a counterclockwise direction, as viewed in Figs. 3 and 4, whereby the contact 52 moves downwardly into engagement with the contact 56. A compression spring 60 is connected between the switch arm 40 and the bracket 48 for resiliently biasing the switch arm in a clockwise direction to hold the arm in engagement with the rod 30 and to move the contact 50 upwardly out of engagement with the contact 56 when the rod moves downwardly upon a rise in the temperature of the liquid. The spring 60 is preferably retained in position by means of a pin 62 inserted through an aperture in the arm 40 and a similar pin 64 on the bracket 48. In order to provide an adjustment for the initial position of the arm 40, a set screw 66 is threaded through the arm for engagement with the rod 30, which set screw may be conveniently locked into position by a nut 68.

In accordance with an important feature of this invention, means is provided for holding the lower switch arm 42 in a raised operative position when the heating unit is associated with the container and for permitting the switch arm 42 to drop to an inoperative position when the heating unit is removed from the container. As will be understood, this feature substantially eliminates all possibility of accidentally energizing the heating unit electrical resistance element while the heating unit is removed from the container. In order to support the lower switch arm 42, a hollow push button member 70 is slidably disposed through aligned apertures in the base or mounting plate 12 and the bracket 48, and a compression spring 72 is inserted within the push button and extends upwardly for engagement with the switch arm 42. A pin 73 extends through the switch arm for retaining the upper end of the spring 72 in the desired position. With this structure, it is seen that when the heating unit 10 is properly positioned on the container 11, the push button 70 engages the upper edge of the container and is raised, as shown in Fig. 4 so that the switch arm 42 is lifted to an operative position. On the other hand, when the heating unit 10 is removed from the container, the push button 70 drops, as shown in Fig. 3, so that the switch arm 42 is lowered to an inoperative position. The push button 70 is provided with an annular flange 74 around the upper end thereof to limit this downward movement.

By adjusting the uppermost position of the switch arm 42, the temperature at which the contact 52 will engage the contact 56 may be easily controlled. This adjustment of the switch arm 42 may readily be accomplished by means including a post 76 threaded into a bushing 78 and extending through a recess 80 in the end of the arm 42. The bushing 78 is mounted in a block 82 fixed to the base plate 12 by a plurality of screws 84. An abutment means in the form of a pair of jam nuts 86 and 88 is disposed on the threaded post for limiting upward movement of the switch arm 42 relative to the mounting or base plate 12. The position of the abutment means or jam nuts may be easily varied by rotating the post 76, and a knob 90 is secured to the upper end of the post for this purpose. Preferably, the knob is provided with a pointer 92 adapted to cooperate with the scale 94 on a cover or housing member 96 enclosing the switch structure.

As an additional safety feature, the heating unit 10 may be provided with a pilot light 98 mounted on a bracket 100 and connected in parallel with the electrical resistance element of the heating unit. A window 102 is provided in the top of the cover 96 to permit the operator to observe the pilot light.

The electrical circuit for the heating unit 10 is diagrammatically illustrated in Fig. 5 and includes a pair of electrical conductors 104 and 106 adapted to be connected to power lines 108 and 110, respectively. The conductor 104 is connected to one end of the electrical resistance element, such as the end 24, and the conductor 106 is connected to the switch contact element 56. Another conductor 112 is provided between the switch contact 52 and the end 22 of the electrical resistance element so that when the switch is closed, the circuit is completed. The pilot light 98 may conveniently be connected in parallel with the electrical resistance element by attaching lines 114 and 116 to the ends 22 and 24 of the electrical resistance element.

While the operation of the above described device appears to be clear, a short description of such operation is as follows. The heating unit 10, which is, of course, connected to a suitable source of electrical energy, is first properly associated with the container 11. In order to facilitate manipulation of the heating unit, a pistol grip type handle 118 is secured to the block 82 by means of a bolt 120. As the heating unit is brought into proper registration with the wall of the container, the push button 70 is raised so that the switch arm 42 is supported in an upper operative position. Since the thermostat heat responsive unit 28 is cool, the switch arm 40 will initially be pivoted counterclockwise substantially the maximum amount so that the contacts 52 and 56 are brought into engagement with each other. This closes the circuit to energize the heat resistance element for heating the liquid in the container, and as the temperature of the liquid is raised, the lower portion 34 of the heat responsive unit expands, and the actuating rod 30 is lowered so that the switch arm 40 is pivoted in a clockwise direction under the influence of the spring 60. In many cases, it is desirable to adjust the set screw 66 so that the initial position of the switch arm 40 is such that the contact 52 engages the contact 56 before the switch arm 42 reaches its uppermost position and engages the abutment means or nut 86. This arrangement insures a longer period of initial heating so that the entire body of liquid in the container is brought up to the desired temperature without interrupting the heating period due to slightly excess temperatures at the lower portion of the liquid body. However, once the temperature of the entire liquid body has been raised to the desired level, the spring 72 yieldably supporting the lower switch arm 42 will be only slightly compressed, if at all, when the switch arm is pivoted in a counterclockwise direction by the heat responsive unit 28, whereby relatively short and frequent heating periods are obtained in order to maintain an even and substantially constant temperature in the body of liquid.

While the preferred embodiment of the present invention has been shown and described herein, it is obvious that many changes may be made in the structural details without departing from the spirit and scope of the appended claims.

The invention is claimed as follows:

1. A combined thermostat and safety switch structure for a heating unit adapted to be removably placed in a heating position in which position the unit is located to act upon a substance to be heated, comprising base means, a pair of electrical contact means each shiftably disposed on said base means for movement relatively to the base means and to each other, heat responsive means for repeatedly actuating one of said contact means toward and away from the other of said contact means, and means shiftably carried by said base means and engageable with a member with which the unit is associated when placed in said heating position for supporting said other of said contact means in an operative position when the heating unit is in said heating position and for moving said last mentioned contact means to an inoperative position when said heating unit is removed from said heating position.

2. A combined thermostat and safety switch structure for a heating unit adapted to be removably placed in a heating position in which position the unit is located to act upon a substance to be heated, comprising a pair of movably mounted electrical contact means, heat responsive means for repeatedly actuating one of said contact means toward and away from said other contact means, and means for resiliently supporting said other of said contact means in an operative position when said heating unit is in said heating position to provide for a relatively long period of engagement between said contact means during an initial heating operation and for moving said last mentioned contact means to an inoperative position when the heating unit is removed from said heating position.

3. A combined thermostat and safety switch structure for a heating unit adapted to be removably placed in a generally horizontal heating position in which position the unit is located to act upon a substance to be heated, comprising a pair of upper and lower superposed electrical contact means mounted for movement in a generally vertical plane toward and away from each other, heat responsive means for repeatedly actuating said upper contact means relatively toward and away from said lower contact means, and depending shiftable means engageable with a member with which the unit is associated when in said heating position for supporting said lower contact means in an operative position when the heating unit is in said heating position and for moving said last mentioned contact means to an inoperative position when the heating unit is removed from said heating position.

4. A combined thermostat and safety switch structure for a heating unit adapted to be removably placed in a heating position in which the unit is located to act upon a substance to be heated, comprising a pair of pivotally mounted arms, an electrical contact secured to each of said arms and disposed for engagement with each other, a heat responsive device operatively associated with one of said arms for repeatedly actuating said one arm relatively toward and away from the other arm, push button means operatively associated with the other of said arms for supporting said other arm in an operative position when the heating unit is in said heating position and for permitting said other arm to move to an inoperative position when the heating unit is removed from said heating position.

5. A combined thermostat and safety switch structure, as defined in claim 4, wherein said push button means includes a spring for resiliently supporting said other arm.

6. A combined thermostat and safety switch structure, as defined in claim 4, which includes adjustable abutment means for limiting movement of said other arm toward said one arm.

7. A combined thermostat and safety switch structure for use with a heating unit adapted to be removably placed in a heating position on a support in which position the unit is located to act upon a substance to be heated, comprising base means, a pair of arms pivotally mounted on said base means, an electrical contact element fixed on each of said arms, heat responsive means for repeatedly actuating one of said arms toward and away from the other of said arms, and push button means slidably mounted on said base means and connected with said other arm, said push button means extending beyond said base means for engagement with said support when the heating unit is in said heating position so that the push button means is actuated to support said other arm in an operative position, and said push button means being operable upon removal of the heating unit from said heating position to permit said other arm to move to an inoperative position.

8. A combined thermostat and safety switch structure, as defined in claim 7, wherein said arms are mounted for pivotal movement about generally horizontal axes, and wherein said heat responsive means includes a tubular shell secured to said base means, an actuating rod disposed within said shell and operatively connected with said one arm, said shell and said actuating rod being constructed of materials having different coefficients of expansion so that said rod moves relative to said base means upon any change of temperature to actuate said one arm.

9. A combined thermostat and safety switch structure, as defined in claim 7, which includes said push button means having a spring for resiliently supporting said other arm, and adjustable abutment means connected with said base means for limiting movement of said last mentioned arm toward said one arm.

References Cited in the file of this patent
UNITED STATES PATENTS

| | | |
|---|---|---|
| 671,139 | Leask | Apr. 2, 1901 |
| 1,509,439 | Morlok | Sept. 23, 1924 |
| 2,008,484 | Belcher | July 16, 1935 |
| 2,039,641 | Fichtner | May 5, 1936 |
| 2,266,090 | Smith | Dec. 16, 1941 |
| 2,350,941 | Stevenson | June 6, 1944 |
| 2,471,260 | Chapman | May 24, 1949 |
| 2,660,658 | Wagner et al. | Nov. 24, 1953 |